United States Patent [19]

Isbester

[11] 3,998,426
[45] Dec. 21, 1976

[54] CLAMSHELL-TYPE HYDRAULIC FLOW CONTROL GATE

[75] Inventor: Thomas John Isbester, Lakewood, Colo.

[73] Assignee: Thomas John Isbester, Lakewood, Colo.

[22] Filed: July 10, 1975

[21] Appl. No.: 594,824

[52] U.S. Cl. .............................. 251/147; 251/212; 251/300
[51] Int. Cl.² ........................................ F16K 3/00
[58] Field of Search .......... 251/212, 147, 300, 299, 251/315

[56] References Cited

UNITED STATES PATENTS

| 892,944 | 7/1908 | Drawe | 251/300 X |
|---|---|---|---|
| 2,742,324 | 4/1956 | Kerensky | 251/300 X |
| 2,785,840 | 3/1957 | Nave | 251/212 X |
| 3,123,334 | 3/1964 | Hitz | 251/300 X |

FOREIGN PATENTS OR APPLICATIONS

| 299,347 | 7/1932 | Italy | 251/212 |

*Primary Examiner*—Arnold Rosenthal
*Attorney, Agent, or Firm*—Gersten Sadowsky; Donald R. Fraser

[57] ABSTRACT

An apparatus for controlling fluid discharge through an outlet of a conduit comprises a clamshell-type gate including first and second opposed gate members pivotally mounted to the exterior of the conduit. The gate members are oppositely rotatable through an arc of approximately 90° between an open position and a closed position just downstream of the outlet. In the closed position, the gate members are closed together along a lip seal at the center of the conduit. A collar seal, mounted to the conduit, is urged against the gate members to block peripheral fluid discharge from the outlet. When the gate is fully or partially open, a portion of the outlet extends downstream of the lip seal to minimize "fan out" of the discharge. In the fully open position, the gate members are open symmetrically beyond the diameter of the outlet for unrestricted fluid discharge through the outlet. The gate members are pivotally attached to trunnion members at each side of the conduit through support arm plates. In one embodiment, the support plates contain elongated slots approximately perpendicular to the gate members that act as cam surfaces for controlling rotation of the gate members. Rotation of the gate members is caused by longitudinal movement of control shafts, guided by the trunnion members. The shafts are connected to follower pins that ride the elongated slots in the support arm plates to provide the camming action. This arrangement produces a closing torque that progressively increases during closure of the gate members. In another embodiment, the support arm plates are linked to opposite legs of yoke members on each side of the conduit. The gate members are rotated by longitudinal movement of the yoke members.

12 Claims, 10 Drawing Figures

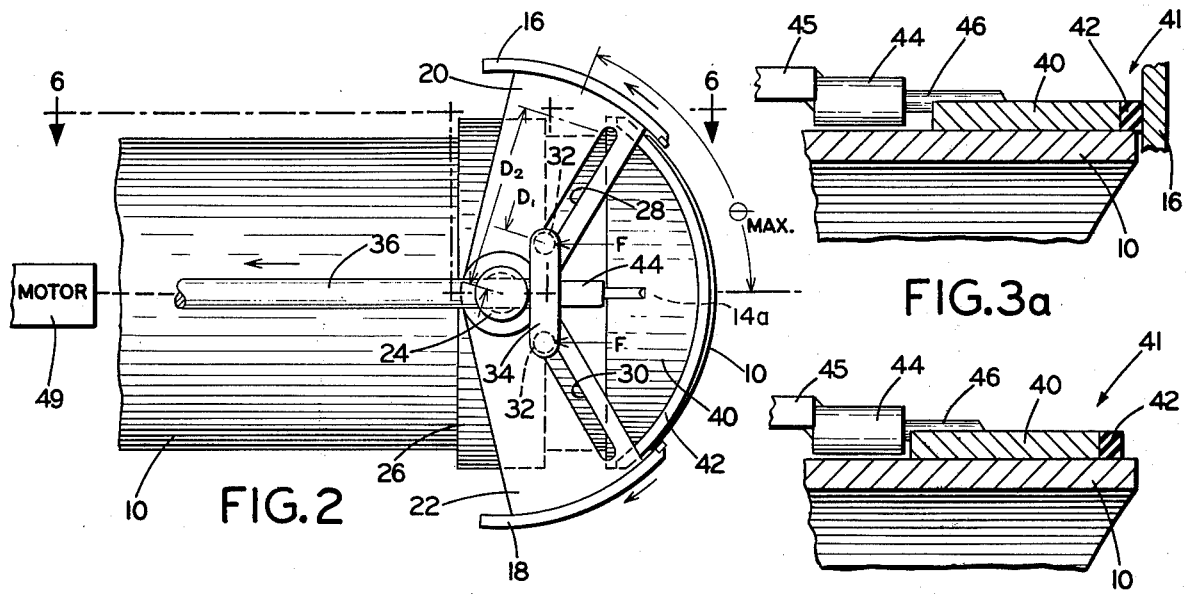
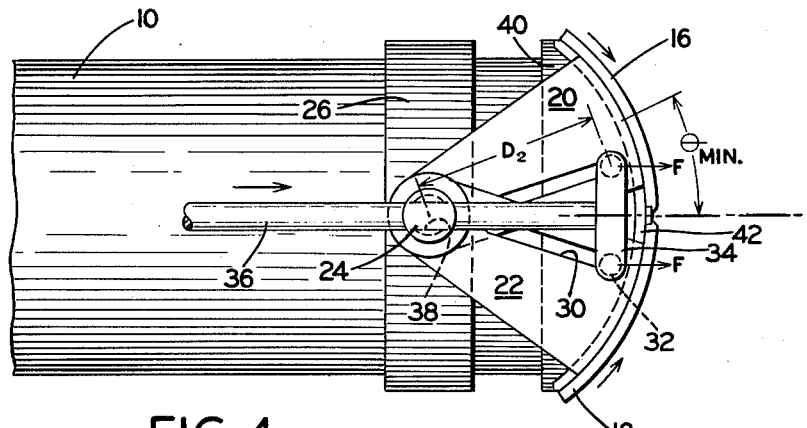
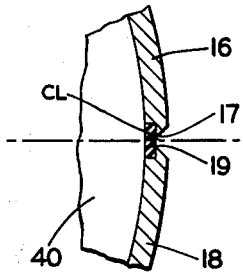
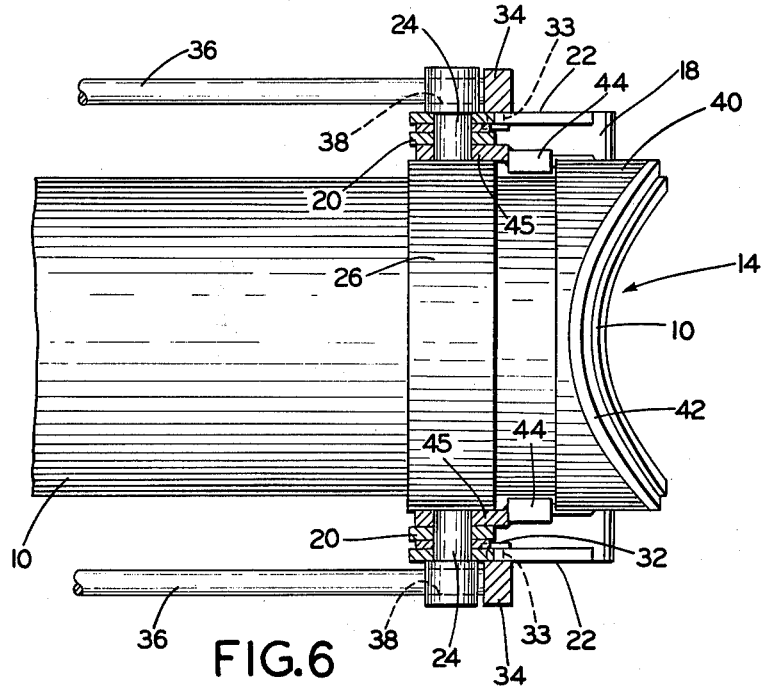

CLAMSHELL-TYPE HYDRAULIC FLOW CONTROL GATE

FIELD OF THE INVENTION

The present invention relates generally to control gates, and more particularly to a clamshell-type control gate mounted to the exterior of a hydraulic conduit for positive discharge control without cavitation.

DESCRIPTION OF THE PRIOR ART

Heavy duty control valve apparatus are generally incorporated at the outlets of large hydraulic conduits, particularly in river and canal outlet works, bypass lines and energy dissipators for either submerged or free releases. The valves variably restrict fluid discharge through the outlets, and are preferably controllable between fully open and fully closed positions.

Control apparatus used heretofore include slide valves, wheel valves, radial valves, roller gates, needle valves, hollow jet valves and butterfly valves. These valves are positioned in line with the outlet and variably interfere with fluid flow as a means for restricting fluid discharge through the outlet. The valves are generally of the type mounted inside the conduit, e.g., butterfly valves, or of the type extending into the body of the conduit, e.g., needle valves. In either type, the valve surface extending into the fluid within the conduit creates two primary disadvantages.

First, the valve surface causes cavitation in the conduit, i.e., low hydraulic pressure pockets just downstream of the valve surface at the fluid-conduit interface. The low pressure pockets, collapsing at the fluid-conduit interface, create highly destructive forces that deteriorate the conduit wall. Cavitation in the conduit can be mitigated by carefully machining the surface of the valve so as to create minimum fluid turbulence in the discharge fluid, intersecting the valve. However, precision machining of the valve surface is tedious and expensive, and the discharge fluid tends to errode the machined, valve surface.

Second, even when conventional control valves are fully open, a portion of the valve still remains in the conduit in line with the flow of discharge fluid. Conventional hydraulic conduit valves of which I am aware cause maximum flow coefficients of less than unity, i.e., less than that of a freely discharging conduit, and typically range between 0.58 and 0.97.

As an additional disadvantage, conventional hydraulic conduit discharge valves of which I am aware are difficult to construct and assembly to a conduit. Conventional valves often require installation at the interior of the conduit and/or machining portions of the inner and outer conduit surfaces, and this substantially increases the cost.

The aforementioned difficulties associated with conventional control valves have led to the development of a clamshell-type hydraulic flow control valve, described in an article entitled "Scientific Investigation of Hydro Technique In The Year 1971, Part 2", published in *Energy, Leningrad Division*, U.S.S.R., 1973. Each gate member of the Russian valve is rotatably mounted on a pair of trunnion members. The trunnion members are, in turn, mounted to a collar on the conduit, offset from the vertical center line. The profile of the outlet is approximately flat but slightly indented along the vertical center line to receive the lips of the gate members when the valve is closed.

While generally somewhat satisfactory, there are several disadvantages associated with the Russian valve. For example, when the gate members are partially or fully open, the outlet is entirely upstream of the gate lips. This causes the discharge to "fan out" from the outlet, creating an unclean jet and associated containment problems when discharge is into a confined region, such as a canyon. As another disadvantage, the gate members, supported by the offset trunnions, must be independently controlled. This calls for a complex structure, and it is difficult to rotate the gate members symmetrically so that they share the hydraulic load equally.

SUMMARY OF THE INVENTION

According to the invention, a clamshell-type control gate is mounted externally to a hydraulic conduit at an outlet for positive control of the discharge fluid without cavitation. The clamshell-type control gate comprises first and second opposed gate members that are pivotally attached to a single pair of trunnion members mounted externally to, and on opposite sides of, the conduit. The gate members, which control the rate of fluid discharge at the outlet, are rotatable through an arc of approximately 90° between a closed position and an open position. In the closed position, the gate members are closed together along a lip seal at the center of the conduit just downstream of the outlet. A movable collar seal is extended firmly against the closed gate members to block any fluid discharge peripherally around the outlet. In the fully open position, the collar seal is retracted from the gate members, and the gate members are opened symmetrically about the center of the conduit beyond the diameter of the outlet for unrestricted fluid discharge, resulting in a flow coefficient of unity. Since there are no valve surfaces inside the conduit, there is no cavitation of the fluid-conduit interface and, accordingly, no requirement to machine any fluid-exposed surfaces.

The radius of curvature of the profile of the outlet is matched to the radius of the curvature of the gate members. When the gate members are partially or fully open, a portion of the outlet extends downstream of the lip seal to serve as a guide to prevent fan out of the discharge.

The gate members are pivotally attached to the pair of trunnion members with support arm plates. The trunnion members are aligned to the horizontal center line of the conduit. Since the support arm plates pivot about a single pair of trunnion members, the gates, driven by common linkage rotate symmetrically about the horizontal center of the outlet. This insures that the gate members share the hydraulic load equally.

The trunnion members are preferably mounted to a collar which is stationarily mounted to the exterior of the conduit. A hydraulic motor, attached to the stationary collar, provides the motive force for selectively extending or retracting the collar seal. However, for some heavy duty applications, it may be desirable to mount the trunnion members to an external, stationary fixture.

In one embodiment, each support arm plate includes an elongated slot, forming a cam surface, aligned approximately perpendicularly to the gate members. On each side of the conduit, the gate drive linkage comprises a control shaft, passing through an aperture in a trunnion member. The shaft is connected to a pin brace containing a pair of follower pins which engage the elongated slots of adjacent support arm plates. The slots function as cam surfaces for controlling symmetrical rotation of the gate members between the open and closed positions in response to longitudinal movement of the control shaft through the aperture in the trunnion member. A small amount of longitudinal movement of the control shaft is sufficient to operate the gate members.

Movement of the control shaft in the direction of the fluid flow (downstream) serves to rotate the gate members toward the center of the conduit. The closing torque applied to the gate members by the follower pins increases as the gate members approach the center of the conduit. The increasing torque offsets an opposite, increasing hydraulic opening force acting on the gate members as they are being closed.

In operation, the gate members are closed by moving the control shaft downstream until the lip seal halves on the gate contact each other. A relatively small amount of shaft movement is required to completely close the gate members and an increasing closing torque, effected by the aforementioned cam and follower arrangement, is provided as the gate members approach the center of the conduit in the fully closed position. When the gate members are fully closed, and positively held together by the pin braces, the collar seal is extended from the stationary collar to tightly seal against the gate members.

To open the gate members, the collar seal is first retracted and the control shaft is moved longitudinally upstream causing the gate members to swing open about the trunnion members. The gate members may be opened partially to variably restrict the fluid flow, but in the fully open position, the gate members swing beyond the diameter of the outlet for unrestricted fluid discharge.

In another embodiment, the gate drive linkage comprises a pair of yoke members having opposite legs attached to the support arm plates through pivotable links. A drive screw, passing through a bore in each yoke member, is rotatably connected to a pair of stationary collars on the outside of the conduit. A pair of nuts, attached to said yoke member at the bores causes the yoke members to be longitudinally driven by rotation of the drive screws. The screws are rotated by motor means to drive the yoke members toward or away from the outlet. As this happens, the legs of the yoke members symmetrically rotate the gate members closed or open.

OBJECTIVES OF THE INVENTION

Accordingly, it is a primary object of the present invention to provide a new and improved discharge control for a fluid conduit that does not cause destructive cavitation or reduce discharge efficiency.

It is another object of the present invention to provide a new and improved clamshell-type control valve that is mounted externally to the conduit.

It is another object of the present invention to provide a new and improved discharge control for a hydraulic conduit that eliminates cavitation at the fluid-conduit interface without a requirement of specially machined valve surfaces.

It is another object of the present invention to provide a new and improved hydraulic discharge control valve that requires a minimum, substantially uniform, force for opening or closing the valve gate members against a discharge fluid flow.

It is another object of the present invention to provide a new and improved discharge control for a hydraulic conduit, wherein fan-out of the discharge is minimized.

It is another object of the present invention to provide a new and improved clamshell gate control valve for the outlet of a conduit, wherein, for reduced fan-out of discharge, a portion of the outlet extends downstream of the gate members in the partially or fully open position.

It is an additional object of the present invention to provide a new and improved discharge control for a hydraulic conduit that is economical to manufacture and easy to install and maintain.

Still other objects and advantages of the present invention will become readily apparent to those skilled in this art from the following detailed description, wherein I have shown and described only the preferred embodiments of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 2 is a side view of the embodiment of FIG. 1 with the gate members fully open;

FIG. 3a is a detail of FIG. 2 showing the collar seal extended;

FIG. 3b is a detail of FIG. 2 showing the collar seal retracted;

FIG. 4 is a side view of the embodiment of FIG. 1 with the gate members fully closed;

FIG. 5 is a partial view of the apparatus of FIG. 4 showing a detail of the lip seal formed between the gate members;

FIG. 6 is a sectional view taken along the line 6—6 in FIG. 2;

DETAILED DESCRIPTION OF THE PREFERRED EMBODIMENTS

Figure 1:
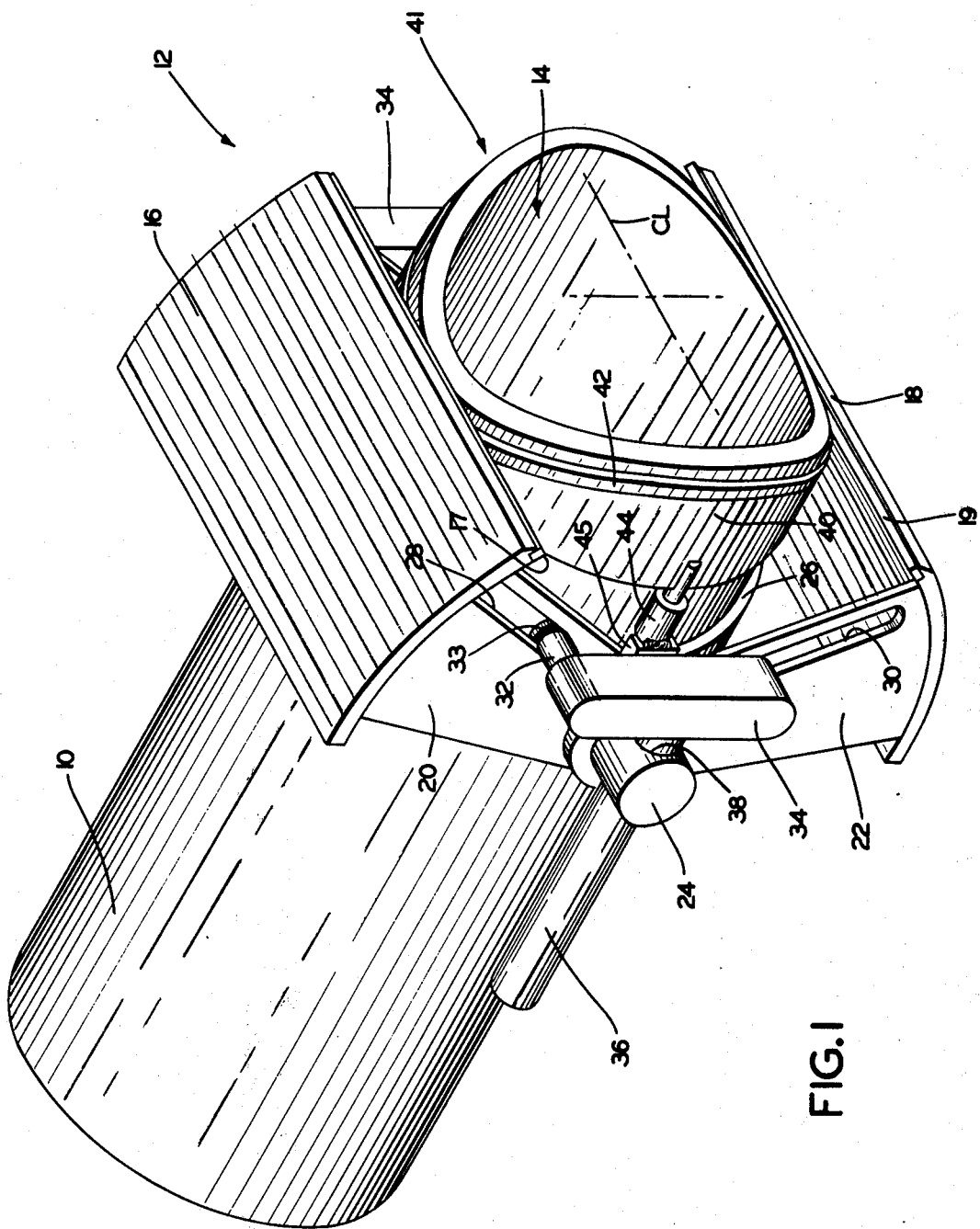
FIG. 1 is a perspective view of one embodiment of the clamshell-type hydraulic discharge control gate of the present invention.

Referring to FIG. 1, there is illustrated a conduit 10 having affixed thereto one embodiment of a discharge control apparatus according to the present invention. Conduit 10 is a conventional, heavy duty conduit used for transferring large quantities of fluid, particularly liquids, utilized, for example, in irrigation, municipal water supplies and hydro-electric power facilities. Conduit 10 is circular in cross section and terminates at an outlet 14. The vertical profile of outlet 14 is curved symmetrically about the center of conduit 10, as seen more clearly in side view, in FIGS. 2 and 4.

Discharge control apparatus 12 comprises opposed gate members 16 and 18, each pivotally attached to trunnion members 24, respectively, through two support arm plates 20 and 22. Trunnion members 24 are secured to the discharge end of the conduit 10 aligned with the horizontal center line of the conduit. Both trunnion members 24, are preferably welded to a collar 26, and are visible in the top view (FIG. 6). Collar 26 is in turn, stationarily mounted to the exterior of conduit 10 by conventional means, such as welding. Mounting trunnion members 24 to collar 26 expedites assembly of control apparatus 12 to conduit 10. Apparatus 12 may be preassembled to the collar prior to mounting to the conduit. As a further alternative for some heavy duty applications, it is preferable to mount trunnion members 24 to an external, stationary support (not shown).

Support arm plates 20 and 22 respectively contain elongated slots 28 and 30. Slots 28 and 30 are aligned approximately perpendicularly to gate members 16 and 18 and form a cam surface for follower pins 32 connected to each end of pin braces 34. Each pin 32 contains a circumferential notch 33 to lock the pins into the slots, and yet permit the pins to freely slide therein. Pin braces 34, on each side of conduit 10, are connected to control shafts 36, and are movably supported parallel to conduit 10 in apertures 38 of trunnion members 24.

As control shaft 36 is moved downstream toward outlet 14, pins 32 following slots 28 and 30, cause gate members 16 and 18 to symmetrically swing together, as shown in FIG. 4, until they close along horizontal diameter or center line CL at lip seal halves 17 and 19, shown in detail in FIG. 5. And when control shaft 36 is moved upstream away from outlet 14, as shown in FIG. 2, control gates 16 and 18 swing open symmetrically about the horizontal center line CL until they are separated just beyond the diameter of outlet 14. Symmetrical operation of gate members 16 and 18 occurs because support arm plates 20 and 22 are pivoted about a common pair of trunnion members 24, and each pair of plates, mounted to the same trunnion member, is rotated by a common set of follower pins 32. This will be discussed in more detail below.

Disposed around the exterior of conduit 10, adjacent outlet 14, is movable collar 40. A collar seal 42 is attached to collar 40. Collar assembly 41, comprising collar 40 and collar seal 42, is selectively extendable or retractable by fluid motor 44. Motor 44, supported through mounting ear 45 (see FIG. 6) by trunnion 24 on stationary collar 26 includes a piston rod 46 secured to movable collar 40. Adequate clearance is provided between the motors 44 and support arm plates 20 and 22 to prevent interference, as seen in FIG. 6.

The operation of movable collar assembly 41 is concerted to the operation of gate members 16 and 18. This will be discussed in more detail in the following paragraphs. As an overview, however, to close gate members 16 and 18, the members are pivoted toward each other by downstream movement of control shaft 36 until they are closed together along horizontal center line CL; then collar assembly 41 is extended by motor 44 to seal against gate members 16 and 18. In this position, discharge through outlet 14 is prevented. To open gate members 16 and 18, collar assembly 41 is first retracted by motor 44 (see FIG. 3b); then control shaft 36 is moved longitudinally upstream to rotate gate members 16 and 18 to the fully open position shown in FIGS. 1 and 2. In that position, flow discharge from outlet 14 is unrestricted.

Referring to FIG. 2, in accordance with an important aspect of the invention, the profile of outlet 14 is curved such that opposite portions 14a of the outlet, along the horizontal diameter extend downstream of gate members 16 and 18 when gate members 16 and 18 are fully open or only partially open (only the fully open condition is shown). The downstream extending portions 14a of outlet 14 (see also FIG. 6) serve as guides to minimize fan-out of discharge. Fan-out is an important consideration where discharge is into a narrow, confined region, such as a canyon. The discharge jet must be well directed with minimum fan-out to prevent erosion of the canyon walls.

The detailed operation of apparatus 12 will become understood with reference to FIGS. 2–6. In FIG. 2, gate members 16 and 18 are shown fully open with control shaft 26 longitudinaly moved by a suitable motor means 49. While opening, the shaft 36 moves upstream of conduit 10 and continues until pin brace 34 is at the inner end of slot 28 at a distance $D_1$ from the center of trunnion 24. As control shaft 36 is moved upstream, as shown, pins 32 in slots 28 and 30, produce forces F (see FIG. 2). Ther is torque action about trunnions 24 produced by the forces F on each of the support arm plates 20 and 22 of gate members 16 and 18.

When closing the gates, control shaft 36 is caused to move downstream of conduit 10 toward outlet 14, as shown in FIG. 4. Thus, an opposite torque is applied to support arm plates 20 and 22 of gate members 16 and 18 by pins 32 in slots 28 and 30 to symmetrically swing the gate members completely closed, as shown in FIG. 4.

Since support arm plates 20 and 22 are pivoted about a common set of trunnion members 24, rotation of gate members 16 and 18 is maintained symmetrical about the horizontal center line during both opening and closing, as well as when the gate members are static. This insures equal sharing the hydraulic load by members 16 and 18 at all times.

Of particular importance, the closing torque applied to gate members 16 and 18 by pins 32 increases between the fully opened position (FIG. 2) to the fully closed position (FIG. 4). The magnitude of the torque applied to each of the support arm plates for either opening or closing gate members 16 and 18 can be described by the following equation:

$$T = FD\sin\theta$$

where:
  $T$ is the torque applied to each support arm plate 20 and 22 on each side of conduit 10;
  $F$ is a constant force supplied by each shaft 36;
  $\theta$ is the instantaneous angle between each plate 20 and 22, and the horizontal, and is variable between $\theta_{min}$ and $\theta_{max}$; and
  $D$ is a lever arm distance between trunnion member 24 and follower pin 32. D is variable between $D_1$ and $D_2$.

As seen in FIGS. 2 and 4, D increases linearly from a minimum $D_1$ with gate members 16 and 18 in the open position (FIG. 2) to a maximum $D_2$ with the members in the closed position (FIG. 4), while $\theta$ decreases from $\theta_{max}$ to $\theta_{min}$. Lever arm D, increasing as gate members 16 and 18 are being closed, tends to provide greater closing torque in the vicinity of $\theta = \theta_{max}$ than of $\theta = \theta_{min}$. Although the increase in torque as gate members 16 and 18 are being closed is offset by the decreasing lever arm angle, $\theta$, the offset is only partial because $\theta_{max} << 90°$ and $\theta_{min} >> 0°$. In practice, I have found that the closing torque is significantly higher when the gate members 16 and 18 are near $\theta_{min}$ (nearly closed) than when they are near $\theta_{max}$ (nearly fully open) for a constant, applied force $F$. The result is positive closure of the gate members 16 and 18. Furthermore, when gate members 16 and 18 are fully closed, pin braces 34, extending between support plates 20 and 22, insure a tight seal between the gate members at horizontal centerline CL.

As mentioned, collar 40 and collar seal 42, forming collar assembly 41, are selectively extendable or retractable along the outer surface of conduit 10. In operation, when the gate members 16 and 18 are closed, collar seal 42 is urged against the gate members forming an effective hydraulic seal to block any fluid discharge from outlet 14.

The operation of collar 40 and collar seal 42 is illustrated more clearly in FIGS. 3a and 3b. In FIG. 3a, collar assembly 41 is extended by piston rod 46 so that collar seal 42 is substantially flush with the outlet end of conduit 10 and sealed against the inner face of the gate 16. Accordingly, when gate members 16 and 18 are closed, and collar assembly 41 is extended, a tight seal is formed between collar assembly 41 and conduit 10 to prevent any peripheral leakage or discharge. In FIG. 3b, collar assembly 41 is retracted from the outlet end of conduit 10 by piston rod 46 of hydraulic motor 44. Collar 40 and collar seal 42 are maintained in the retracted position (FIG. 3b) at all times except when gate members 16 and 18 are fully closed.

Collar seal 42 may be formed of rubber or other elastic material and bonded directly to collar 40, and may be solid (as shown) or hollow. If seal 42 is hollow, it may be air or water inflatable.

Alternatively, collar seal 42, rather than being formed on the collar 40 movable along outer surface of conduit 10, may be formed in an annular groove along the inner surface at the end face of the conduit. The seal in this case would also extend substantially flush with the outlet end of the conduit (not shown). In this alternate embodiment, the seal is stationary; however, I have found that, in practice, an adequate seal for many applications may be formed.

Figure 7:
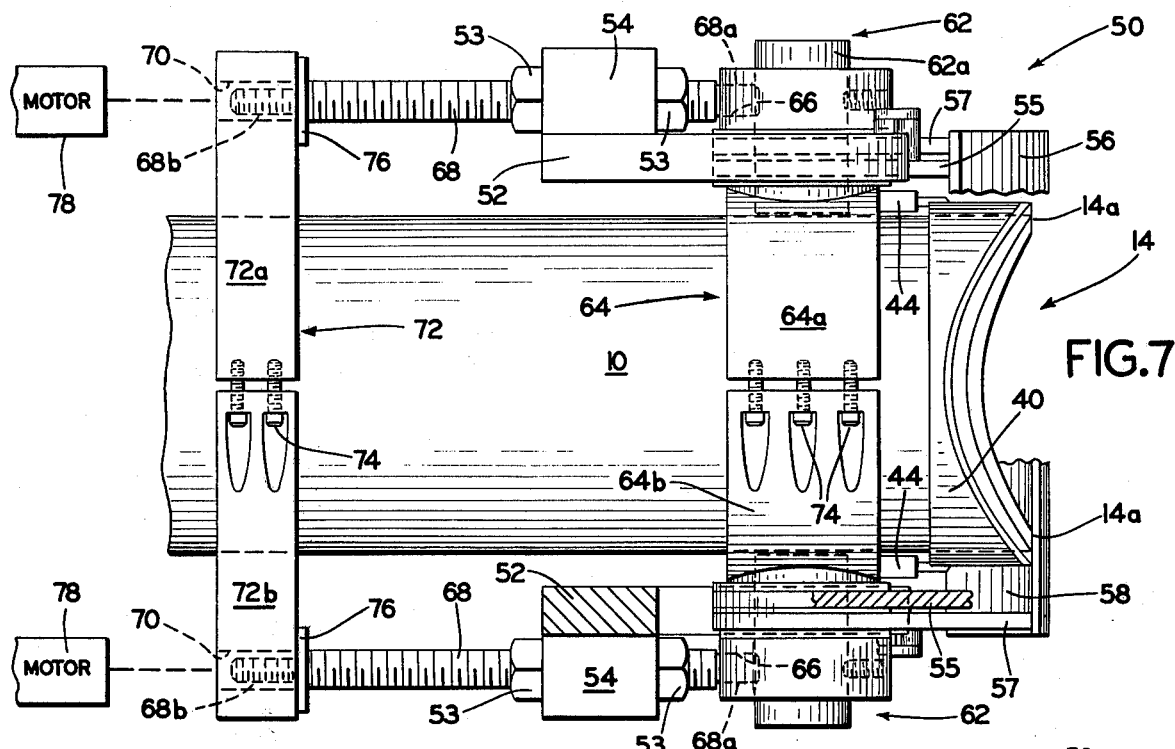
FIG. 7 is a partial top view of another embodiment of the present invention.
Figure 8:
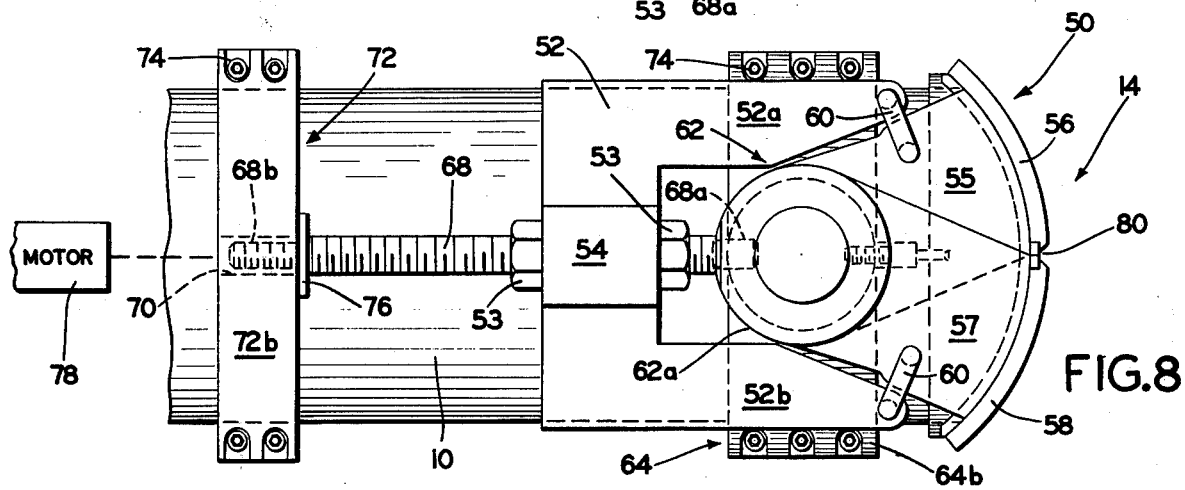
FIG. 8 is a side view of the embodiment of FIG. 7 with the gate members closed.
Figure 9:
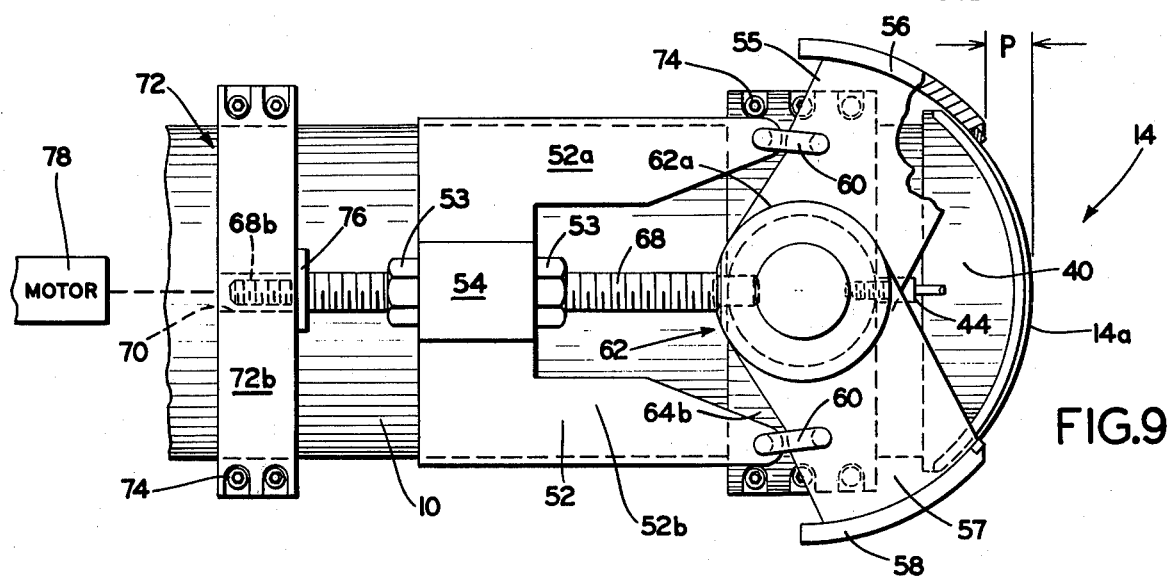
FIG. 9 is a side view of the embodiment of FIG. 7 with the gate members fully open.

Referring to FIGS. 7–9, there is illustrated another embodiment of the present invention which is particularly suitable for heavy duty operation. Discharge control apparatus 50 comprises a pair of yoke members 52 located on opposite sides of conduit 10 for controlling gate members 56 and 58. Yoke members 52 include legs 52a and 52b connected to support arms 55 and 57 of gate members 56 and 58 through links 60. Control of gate members 56 and 58 is provided by longitudinally driving yoke members 52 with drive screws 68, as described in more detail below.

Referring to FIGS. 7 and 8 (gate members 56 is partially removed in FIG. 7 for clarity), support arms 55 and 57 are pivotally attached to trunnion members 62, in turn mounted to collar 64. Trunnion members 62 are oversized compared to trunnion members 24 in FIG. 1 in order to withstand high pressure flow through conduit 10 when gate members 56 and 58 are at least partially closed.

Each of the trunnion members 62 contains a bore 66 for rotatably receiving one end of a drive screw 68. The other end of screw 68 is received by bore 70 of a collar 72.

Collars 64 and 72 are stationarily mounted to conduit 10 with bolts 74. The collars 64 and 72 are each formed of two half sections 64a, 64b and 72a, 72b, respectively, joined together on opposite sides of conduit 10 by the bolts 74. This permits convenient assembly of apparatus 50 to conduit 10 on site without welding.

The end portions 68a and 68b of drive screws 68 are unthreaded for free rotation between collars 64 and 72. End portion 68a abuts inner elements 62a of trunnion member 62, while washers 76 are welded to the drive screws adjacent the end portions to abut the face of collar 72.

Yoke members 52 are mounted to drive screws 68 with receiving portions 54 extending outwardly from the base of each member. A pair of nuts 53, welded to opposite sides of receiving portions 54, receive the threads of drive screws 68. Rotation of drive screws 68 by motor means 78 causes controlled longitudinal movement of yoke members 52 via nuts 53 between stationary collars 64 and 72.

Referring to FIG. 8, gate members 56 and 58 are fully closed with yoke members 52 positioned near outlet 14, the gate members having been closed by rotating drive screw 68 moving yoke member 52 toward collar 64. Gate members 56 and 58 receive torque from links 60 tending to rotate the gates together until they close along lip seal 80. Links 60, urged against gate members 56 and 58 by yoke members 52, maintain the gate members in firm abutment to each other. Collar 40 is also maintained in abutment to gate members 56 and 58 with motor 44 to prevent any discharge leakage as described in detail with respect to the embodiment of FIG. 1.

To open gate members 56 and 58, motor means 78 rotates drive screws 68 oppositely moving the yokes 52 toward stationary collar 72. Links 60 impart opposite torque to gate members 56 and 58, swinging them open. The size of the discharge aperture at outlet 14 is a function of the longitudinal position of the yokes 52.

Motor means 78 on each side of conduit 10 are operated synchronously to each other so as to provide symmetrical rotation of the drive screws 68 for both opening and closing gate members 56 and 58. This insures equally shared loading of the yoke members 52 on the opposite sides of conduit 10.

The vertical profile of outlet 14 of conduit 10 is curved (see FIG. 9) with portions 14a lying on the horizontal diameter of the conduit, extending downstream of gate members 56 and 58, when the members are at least partially open. A length P of outlet portion 14a extends downstream of gate members 56 and 58 to limit lateral flow and thereby reduce fan-out of discharge. The length of outlet portion 14a extending downstream of the gate members 56 and 58 is maximum with the gate members fully opened, as shown in FIG. 9, but decreases to zero as the gate members are closed.

In summary, a clamshell-type discharge control gate for a hydraulic conduit has been described wherein the entire gate and control is mounted outside the conduit. This prevents cavitation at the fluid-conduit interface as exists in conventional, interior mounted valves, and provides unrestricted discharge of fluid when the gate is fully open. The exterior mounting arrangement also enables one-step assembly of the gate and control to the conduit. In one embodiment, an inventive pin and slot coupling arrangement causes a pair of opposed, oppositely rotating gate members to close with an increasing torque. The increasing closing torque offsets the opposite, hydraulic opening force acting on the gate members, and permits the use of a minimum capacity, constant output power source for operating the gate members. When the gate members are fully closed, a preferred collar seal, urged against the gate members, prevents any discharge of fluid at the outlet. In another embodiment, yoke members located on opposite sides of the conduit are linked to the gate members. The rate of discharge from the outlet is a function of the longitudinal position of the yoke members.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

What is claimed is:
1. An apparatus for controlling fluid discharge through an opening in a conduit comprising,
   an outlet whereof a continuously curved perimetral surface defines said conduit opening with oppositely disposed concave sections whereto oppositely disposed convex sections are continua thereof, and wherein said convex sections serve as guide means for reducing fan-out of the discharge fluid from said outlet,
   first and second arcuately curved gate members,
   means for rotatably mounting said gate members externally to said conduit, said gate members being movable upon said outlet between a fully closed position and a fully open position, said gate members in said fully closed position being contiguous to said concave and convex sections at said perimetral surface thereof and in contact at a central portion of said conduit downstream of said outlet, and said gate members in transition between said full positions thereof are movable across said continuous surface in symmetrical dispositions with respect to and beyond said central portion of said conduit opening, and said gate members in said fully open position stand beyond said convex sections at positions contiguous to said concave sections,
   means for rotating said gate members between said full positions thereof for variably restricting fluid discharge through said outlet, and
   seal means supported on said conduit at said outlet, said seal means forming a seal between said conduit and said gate members in said closed position.

2. The apparatus of claim 1 wherein said mounting means includes means for rotatably mounting said gate members to the exterior of said conduit.

3. The apparatus of claim 2 wherein said mounting means includes trunnion means secured to opposite sides of the exterior of said conduit, and each of said gate members includes first and second support arms rotatably attached to said trunnion means, corresponding ones of said support arms attached to said trunnion means at said opposite sides of said conduit.

4. The apparatus of claim 3 wherein said rotating means includes control shaft means movably mounted to said trunnion means and coupled to said support arms for causing equal and opposite rotation of said gate members.

5. The apparatus of claim 1 including lip seal means formed between said first and second gate members.

6. The apparatus of claim 3 wherein said rotating means includes yoke means, opposite legs of said yoke means being linked to said support arms, longitudinal movement of said yoke means causing rotation of said gate members about said trunnion means, and means for causing longitudinal movement of said yoke means.

7. The apparatus of claim 6 wherein said yoke means includes means for receiving a drive screw, and means for causing longitudinal movement of said yoke member including motor means for rotating said drive screw.

8. The apparatus of claim 1 wherein said perimetral surface appears in profile as a vertically disposed symmetrical curve, said gate members are rotatably mounted on a single pair of trunnion members, and said gate members having a radius of curvature which is equal to the radius of curvature of said profile curve.

9. An apparatus for controlling fluid discharge through an outlet of a conduit, comprising,
   first and second opposed gate members,
   means for rotatably mounting said gate members externally to said conduit, said gate members being movable between an open position and a closed position, said gate members being closed together when meeting at a central portion of said conduit downstream of said outlet, and on being open are symmetrically disposed beyond said central portion,
   means for rotating said gate members between said closed position and said open position for variably restricting fluid discharge through said outlet,
   seal means including a collar seal supported on the exterior of said conduit adjacent said outlet, said collar seal being extendable to seal against said gate members in said closed position, and motive means for selectively extending or retracting said collar seal with respect to said gate members, and
   guide means formed on said outlet for reducing fan-out of the discharge from said outlet.

10. An apparatus for controlling fluid discharge through an outlet of a conduit, comprising
    first and second opposed gate members
    means for rotatably mounting said gate members externally to said conduit, said gate members being movable between an open position and a closed position, said members being closed together when meeting at a central portion of said conduit downstream of said outlet, and on being open are symmetrically disposed beyond said central portion,
    means for rotating said gate members between said closed position and said open position for variably restricting fluid discharge through said outlet,
    trunnion means secured to opposite sides of the exterior of said conduit constituting said mounting means, and each of said gate members including first and second support arms rotatably attached to said trunnion means, corresponding ones of said support arms being attached to said trunnion means at said opposite sides of said conduit, said rotating means including control shaft means movably mounted to said trunnion means and coupled to said support arms for causing equal and opposite rotation of said gate members, and each of said support arms including an elongated slot approximately perpendicular to said gate members, and said coupling means includes a pin brace connected to said control shaft means and slidably mounted to said slots of corresponding ones of said support arms, seal means supported on said conduit at said outlet, said seal means forming a seal between said conduit and said gate members in said closed position, and guide means formed on said outlet for reducing fan-out of the discharge from said outlet.

11. An apparatus for controlling fluid discharge through an opening in a conduit comprising, an outlet whereof a continuously curved perimetral surface defines said conduit opening with oppositely disposed concave sections whereto oppositely disposed convex sections are continua thereof, and wherein said convex sections serve as guide means for reducing fan-out of the discharge fluid from said outlet, first and second arcuately curved gate members, means for rotatably mounting said gate members externally to said conduit, said gate members being movable upon said outlet between a fully closed position and a fully open position, said gate members in said fully closed position being contiguous to said concave and convex sections at said perimetral surface thereof and in contact at a central portion of said conduit downstream of said outlet, and said gate members in transition between said full positions thereof are movable across said continuous surface in said outlet, and said gate members in transition between said full positions thereof are movable across said continuous surface in symmetrical dispositions with respect to and beyond said central portion of said conduit opening, and said gate members in said fully open position stand beyond said convex sections at positions contiguous to said concave sections, means for rotating said gate members between said full positions thereof for variably restricting fluid discharge through said outlet, and seal means supported on said conduit at said outlet, said seal means forming a seal between said conduit and said gate members in said closed position.

12. The apparatus of claim 11 wherein said moving means includes a motor mounted to the exterior of said stationary collar and coupled to said collar seal for controlled extension or retraction of said collar seal.

* * * * *